United States Patent
Ilcisin et al.

[11] Patent Number: 6,118,213
[45] Date of Patent: Sep. 12, 2000

[54] PLASMA ADDRESSED LIQUID CRYSTAL DISPLAY DEVICE WITH INTEGRATED SOURCE OF REACTIVE GAS

[75] Inventors: Kevin J. Ilcisin; Thomas S. Buzak, both of Beaverton, Oreg.; Paul C. Martin, Vancouver, Wash.

[73] Assignee: Tektronix, Inc., Beaverton, Oreg.

[21] Appl. No.: 08/879,349

[22] Filed: Jun. 20, 1997

Related U.S. Application Data

[60] Provisional application No. 60/022,002, Jun. 28, 1996.

[51] Int. Cl.⁷ ...................................................... H01J 17/49
[52] U.S. Cl. ............................................ 313/582; 313/584
[58] Field of Search ...................................... 313/490, 491, 313/493, 497, 336, 582, 584, 496; 359/254

[56] References Cited

U.S. PATENT DOCUMENTS

| | | | |
|---|---|---|---|
| 4,767,965 | 8/1988 | Yamano et al. | 313/491 |
| 5,528,109 | 6/1996 | Ilcisin et al. | 315/169.4 |
| 5,549,934 | 8/1996 | Garza et al. | 427/489 |
| 5,635,795 | 6/1997 | Itoh et al. | 313/496 |
| 5,663,611 | 9/1997 | Seats et al. | 313/584 |
| 5,684,356 | 11/1997 | Jeng et al. | 313/336 |
| 5,804,920 | 9/1998 | Khan et al. | 313/582 |
| 5,903,381 | 3/1999 | Watanabe et al. | 359/254 |
| 5,939,827 | 8/1999 | Hinchliffe | 313/582 |

FOREIGN PATENT DOCUMENTS

| | | | |
|---|---|---|---|
| 0 698 903 | 2/1996 | European Pat. Off. | H01J 17/20 |
| 0 780 874 | 6/1997 | European Pat. Off. | H01J 17/20 |
| 30 40 761 | 5/1982 | Germany | H01J 17/20 |

OTHER PUBLICATIONS

W. Espe et al. "Über Gasnachlieferung für Wasserstoffgefüllte Entladungsröhren" Feinwerktechnik vol. 69, No. 11, Nov., 1965.

*Primary Examiner*—Michael H. Day
*Attorney, Agent, or Firm*—John D. Winkelman; John Smith-Hill

[57] ABSTRACT

A plasma addressed liquid crystal display panel includes a channel substrate, a cover sheet sealed to the channel substrate and extending over the channels in the channel substrate, helium in the sealed volume defined by the channel substrate and the cover sheet at a partial pressure within the range from about 50 mB to about 350 mB, and a body of a storage material that reversibly absorbs and releases hydrogen, the hydrogen being present at a partial pressure in the sealed volume within the range from about 0.02 mB to about 36 mB.

7 Claims, 3 Drawing Sheets

PLASMA ADDRESSED LIQUID CRYSTAL DISPLAY DEVICE WITH INTEGRATED SOURCE OF REACTIVE GAS

CROSS REFERENCED TO RELATED APPLICATIONS

This application claims the benefit of U.S. Provisional Application No. 60/022,002, filed Jun. 28, 1996.

BACKGROUND OF THE INVENTION

This invention relates to a plasma addressed liquid crystal (PALC) display device with an integrated source of reactive gas.

U.S. Pat. No. 5,077,553 discloses apparatus for addressing data storage elements. A practical implementation of the apparatus shown in U.S. Pat. No. 5,077,553 is illustrated schematically in FIG. 4 of the accompanying drawings.

The PALC display panel shown in FIG. 4 comprises, in sequence from below, a polarizer 2, a channel substrate 4, a cover sheet 6, a layer 10 of electro-optic material, an array of parallel transparent data drive electrodes (only one of which, designated 12, can be seen in the view shown in FIG. 4), an upper substrate 14 carrying the data drive electrodes, and an upper polarizer 16. The channel substrate 2 is typically made of glass and is formed with multiple parallel channels 20 in its upper main face. The channels 20 are filled with an ionizable gas. A ground electrode and a strobe electrode are provided in each of the channels 20. The channels 20 are orthogonal to the data drive electrodes and the region where a data drive electrode crosses a channel (when viewed perpendicularly to the panel) forms a discrete panel element 22. Each panel element can be considered to include elements of the layer 10 and the upper and lower polarizers 2 and 16. In the case of a color display panel, the panel elements include color filters (not shown) between the layer 10 and the upper substrate 14. The region of the upper surface of the display panel that bounds the panel element constitutes a single pixel 24 of the display panel.

As explained in U.S. Pat. No. 5,077,553, when a suitable potential difference is established between the strobe and ground electrodes in one of the channels, the gas in that channel forms a plasma that provides a conductive path at the lower surface of the cover sheet. If a data drive electrode is at ground potential, there is no significant electric field in the volume element of electro-optic material where the data drive electrode crosses the channel and the panel element is considered to be off, whereas if the data drive electrode is at a substantially different potential from ground, there is a substantial electric field in that volume element of electro-optic material and the panel element is considered to be on.

It will be assumed in the following description, without intending to limit the scope of the claims, that the lower polarizer 2 is a linear polarizer and that its plane of polarization can be arbitrarily designated as being at 0° relative to a reference plane, that the upper polarizer 16 is a linear polarizer having its plane of polarization at 90°, and that the electro-optic material is a twisted nematic liquid crystal material that rotates the plane of polarization of linearly polarized light passing therethrough by an angle that is a function of the electric field in the liquid crystal material. When the panel element is off, the angle of rotation is 90°; and when the panel element is on, the angle of rotation is zero.

The panel is illuminated from the underside by an extended light source (not shown) that emits unpolarized white light. A rear glass diffuser (not shown) having a scattering surface may be provided between the light source and the panel in order to provide uniform illumination of the panel. The light from the source is linearly polarized at 0° by the lower polarizer 2 and passes sequentially through the channel substrate 4, the channels 20, the cover sheet 6, and a volume element of the liquid crystal material toward the upper polarizer 16 and a viewer 26. If a given panel element is off, the plane of polarization of linearly polarized light passing through the volume element of liquid crystal material is rotated through 90°, and therefore the plane of polarization of light incident on the upper polarizer element is at 90°.

The light is passed by the upper polarizer element and the pixel is illuminated. If, on the other hand, the panel element is on, the plane of polarization of the linearly polarized light is not changed on passing through the volume element of liquid crystal material. The plane of polarization of light incident on the upper polarizer element is at 0° and therefore the light is blocked by the upper polarizer element and the pixel is dark. If the electric field in the volume element of liquid crystal material is intermediate the values associated with the panel element being off and on, light is passed by the upper polarizer element with an intensity that depends on the electric field, allowing a gray scale to be displayed.

Helium is an advantageous choice for the gas to use in a plasma addressed liquid crystal display panel because it is inert and therefore does not react with the electrodes in the plasma channels. Also, because helium ions are light, they do not cause substantial sputtering damage to the strobe electrodes, which are typically formed from a metal core with a surface coating of a rare earth hexaboride or from a screen printed or sand blasted metal based paste.

When the PALC display panel disclosed in U.S. Pat. No. 5,077,553 is used as a raster scan display panel for displaying an NTSC video signal, the panel is oriented so that the channels extend horizontally and the data drive electrodes extend vertically. The first active line of a frame of the video signal is sampled. A negative-going strobe pulse is applied to the strobe electrode in the first channel to establish a plasma in the first channel, and the data drive electrodes are driven to voltage levels that depend on the respective sample values. In each panel element along the first channel, an electric field that establishes the state of the panel element is created between the data drive electrode and the lower surface of the cover sheet. The strobe pulse is removed, and the plasma is extinguished, but the electric field persists, maintaining the state of the panel element until the first channel is again addressed, on the next frame of the video signal. This sequence of operations is repeated in order for the remaining active lines of the frame and the remaining channels of the display panel.

The plasma that was created in the first channel is not extinguished instantaneously when the strobe pulse is removed, but decays over a finite interval. If the voltages for the next line of video data are applied to the data drive electrodes before the plasma in the first channel is fully decayed, the electric field that is created in a panel element along the first channel will not have the proper value, and this will generally result in a loss of image quality. Therefore, it is necessary that the plasma created in response to a previous strobe pulse shall be fully extinguished before the data drive electrodes are driven to the voltages for the next line of video.

A plasma is considered to have decayed fully (or to be fully extinguished) if the voltage stored by the active display element is at least 90 percent of the voltage that would have been stored if the gas in the inactive channel had not been ionized.

It can be shown that in the event that the display panel disclosed in U.S. Pat. No. 5,077,553 is used to display a video signal, composed of 480 lines addressed at a frame rate of 60 Hz, the time that elapses between removing the strobe pulse in one channel and driving the data drive electrodes for the next line of the display is approximately 30 $\mu$s. Accordingly, the plasma created in a given channel must decay within approximately 30 $\mu$s after the strobe pulse is removed.

Use of helium as the ionizable gas in a PALC display panel is subject to the disadvantage that on recombination of a helium ion with an electron, the helium atom does not always pass immediately to the ground state, but it may remain for a significant period of time in a metastable state. If a metastable helium atom receives energy, e.g. from a collision with an electron or with another helium atom, the metastable helium atom might undergo secondary ionization, thus delaying complete extinction of the plasma.

One mechanism by which a metastable helium atom in a PALC display panel decays is through collision with the walls of the channel. In the case of a plasma addressed liquid crystal display panel suitable for an NTSC display, the dimensions of the channels are such that metastable helium atoms will collide with the walls of the channel and revert to the ground state at a sufficient rate that the plasma will be considered to be fully extinguished within 30 $\mu$s after removal of the strobe pulse. Accordingly, the existence of the metastable state does not significantly degrade operation of a plasma addressed liquid crystal display panel when driven by an NTSC signal.

In the event that the PALC display panel is to be used to provide an HDTV display, the number of lines of the display and the frequency at which the frame is refreshed are such that the plasma in a given channel must be reliably extinguished within about 8–16 $\mu$s after the pulse is removed from the strobe electrode. If helium alone is used as the gas in the panel, the existence and persistence of the metastable states impairs the viewability of the display.

It has been found that if a suitable dopant gas is present in the panel, the extinction of the plasma is accelerated. The mechanism by which the dopant gas operates is not fully understood, but it is believed that it reduces the number of metastable atoms formed and/or hastens the decay of the metastable atoms. Several dopant gases have been evaluated.

One dopant gas that is effective to accelerate extinction of the plasma is nitrogen. See U.S. patent application Ser. No. 08/576,382 filed Dec. 21, 1995, and now abandoned the disclosure of which is hereby incorporated by reference herein. However, nitrogen may not be optimum because the nitrogen ions are heavy and may cause sputtering damage to the strobe electrodes. Also, the nitrogen ions may react strongly with electrode metal and degrade the strobe electrodes. Another dopant gas that has been evaluated is hydrogen. The hydrogen ion is light and so sputtering damage to the electrodes is small. Although the hydrogen ion reacts with the electrode metal, the reaction between hydrogen and the electrode metal does not degrade the strobe electrodes to an unacceptable degree.

It has been found that a satisfactory LDTV image is displayed if hydrogen is present in a helium filling at a concentration in the range from about 0.01 percent to 20 percent in a total chamber pressure between 50 mB and 500 mB. Thus, the partial pressure of hydrogen is between about 0.005 mB and about 100 mB.

An HDTV display panel would typically have 1,200 channels. In the case of the channels each being about 40 cm long, the total volume of the channels would be about 0.05 liters. If the total pressure in the chamber is 200 mB and the partial pressure of hydrogen is 2 mB, the quantity of hydrogen present at 300 K is about 0.7 mB liter (1,000 mB liter is the quantity of gas at standard temperature and pressure occupying one liter). It has been estimated that hydrogen is consumed by reaction with the electrode material at the rate of $1 \times 10^{-6}$ mB liter/hour/cm channel length. The maximum rate of consumption for such an HDTV display panel would be about $50 \times 10^{-3}$ mB liter/hour and 0.1 mB liter would therefore be consumed in about two hours. Thus, the viewability of the panel would deteriorate to an unacceptable degree after about two hours of operation. If the total pressure were increased to 240 mB and the partial pressure of hydrogen were increased to 36 mB, so as to keep the partial pressure of helium about the same, the quantity of hydrogen would be about 1.8 mB liter, which would be consumed in approximately 36 hours.

It is generally accepted that in order for a television display panel to be commercially acceptable, it must operate for at least 10,000 hours (corresponding to a useful life of about 10 years) without significant degradation in the quality of the display. In order to maintain the partial pressure of hydrogen at 36 mB over 10,000 hours of use, a total hydrogen capacity of 500 mB liter would be needed, having a mass of about 60 mg, or about 280 times the amount needed to charge the panel to a partial pressure of 36 mB. For a panel having channels of length other than 40 cm, the mass of hydrogen required to maintain the partial pressure of hydrogen at 36 mB over 10,000 hours of use scales in accordance with the length of the channels.

It would in principle be possible to replenish the hydrogen as the quality of the display is seen to deteriorate by introducing hydrogen into the panel from an external source under control of a valve.

SUMMARY OF THE INVENTION

In accordance with a first aspect of the invention there is provided a plasma addressed liquid crystal display device comprising a channel substrate defining an array of interconnected channels, a cover sheet extending over the channels and sealed to the channel substrate, whereby the channel substrate and the cover sheet define a sealed volume, an ionizable gas in said sealed volume, a pair of electrodes in each channel for selectively ionizing the gas in the respective channel, and a source of a dopant gas in communication with the sealed volume, said source comprising a body of a storage material that reversibly absorbs and releases said dopant gas, whereby an equilibrium is established between concentration of dopant gas in the body of material and partial pressure of the dopant gas in said sealed volume.

In accordance with a second aspect of the invention, there is provided a plasma addressed liquid crystal display panel comprising a channel substrate having a periphery and defining an array of parallel interconnected channels, a cover sheet extending over the channels and sealed to the channel substrate, whereby the channel substrate and the cover sheet define a sealed volume, helium in said sealed volume at a partial pressure within the range from about 50 mB to about 350 mB, a pair of electrodes in each channel for selectively ionizing the helium in the respective channel, and a body of a storage material that reversibly absorbs and releases hydrogen, the hydrogen being present at a partial pressure in the sealed volume within the range from about 0.02 mB to about 36 mB.

In accordance with a third aspect of the invention there is provided a plasma addressed liquid crystal display panel comprising a channel substrate having a periphery and defining an array of parallel interconnected channels, a cover sheet extending over the channels and sealed to the channel substrate, whereby the channel substrate and the cover sheet define a sealed volume, argon in said sealed volume at a partial pressure within the range from about 50 mB to about 350 mB, a pair of electrodes in each channel for selectively ionizing the argon in the respective channel, and a body of a storage material that reversibly absorbs and releases hydrogen, the hydrogen being present at a partial pressure in the sealed volume within the range from about 0.02 mB to about 36 mB.

In accordance with a fourth aspect of the invention, there is provided an improved method of manufacturing a plasma addressed liquid crystal display panel comprising (a) providing a channel substrate that defines an array of interconnected plasma channels having a pair of electrodes in each channel for selectively ionizing gas in the respective channel, (b) placing a cover sheet over the channels and attaching the cover sheet to the channel substrate whereby the channel substrate and the cover sheet define a chamber, (c) heating the channel substrate assembly to a temperature of at least about 200° C., (d) exhausting gas from the chamber to a pressure below about $10^{-5}$ torr, (e) introducing an ionizable gas into said chamber, and (f) sealing said chamber, wherein the improvement comprises (g) between step (a) and step (c), providing a body of a material that reversibly absorbs and releases a selected gas in accordance with partial pressure of said selected gas and placing said body of material in fluid flow communication with said chamber, and (h) between step (c) and step (f), introducing said selected gas into said chamber.

BRIEF DESCRIPTION OF THE DRAWINGS

For a better understanding of the invention, and to show how the same may be carried into effect, reference will now be made, by way of example, to the accompanying drawings, in which.

In the several figures of the drawings, like reference numerals are used to designate corresponding components.

DETAILED DESCRIPTION

Figure 1:
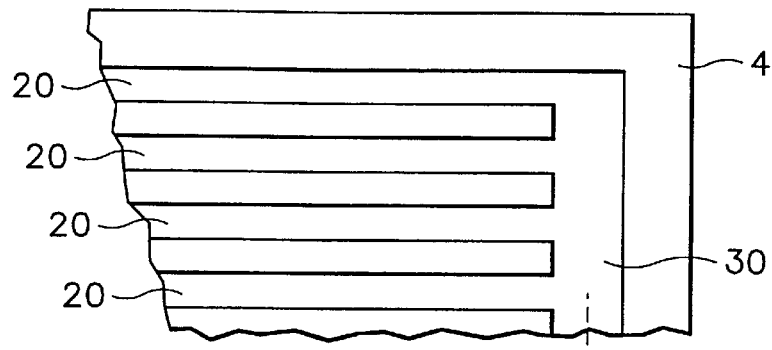
FIG. 1 is a partial schematic illustration of a PALC display panel in accordance with the present invention.
Figure 1:
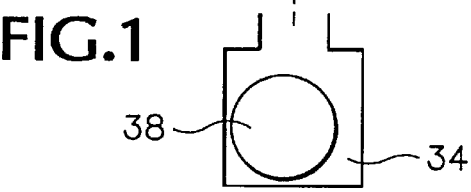

FIG. 1 shows the plasma channels 20 formed in the channel substrate 4 of a PALC HDTV display panel. The plasma channels 20 communicate with a manifold channel 30. The manifold channel communicates in a manner not shown in FIG. 1 with a container 34, which is outside the display field. The interior space of the container and the interior space of the panel are sealed from the exterior of the panel.

The container 34 contains a tablet 38 of hydrogen storage material. Hydrogen storage materials store hydrogen by incorporating the hydrogen into the molecular structure of the material. Such hydrogen storage materials, which are well known and are commercially used as hydrogen getters, for example, can typically store from 1 to 6 percent hydrogen by weight. In order to store 180 mg of hydrogen, to ensure that the supply of hydrogen is not depleted at the end of 10,000 hours and the display panel is still operating, it is necessary to include about 3 to 18 g of hydrogen storage material.

When a hydrogen storage material of this nature is in a closed chamber, the concentration of hydrogen held in the storage material is balanced with the partial pressure of hydrogen in the chamber. Thus, as hydrogen is consumed through use of the panel, the partial pressure of hydrogen in the panel falls; and hydrogen is released by the storage material and equilibrium is established at a slightly reduced partial pressure and slightly reduced concentration.

During manufacture of a PALC display panel, there are operations that are conducted at elevated temperatures, such as sealing the panel glass, curing polymer layers and eliminating anisotropies in the liquid crystal material. There is a danger of undesirable reactions between hydrogen and materials in the panel at high temperatures, causing damage to components of the panel. Also, if the panel were placed under vacuum at high temperature with the storage material exposed, the hydrogen could be depleted before panel operation started, severely limiting the useful life of the panel. It is therefore preferred that the hydrogen not be introduced into the panel until after high temperature processing has been completed.

Figure 1A:
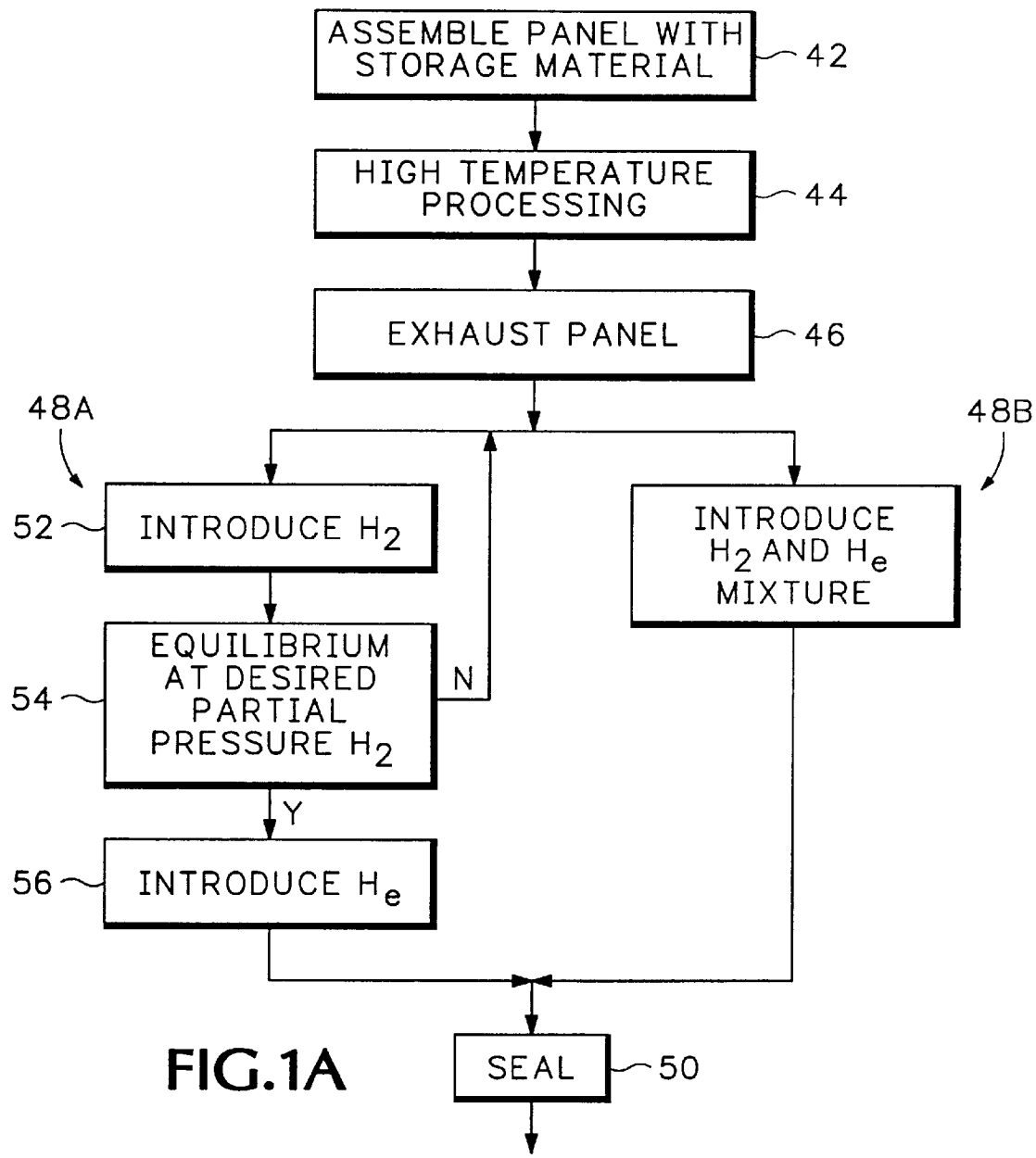
FIG. 1A is a flow chart illustrating some of the steps in manufacture of the PALC display panel shown in FIG. 1.
Figure 4:
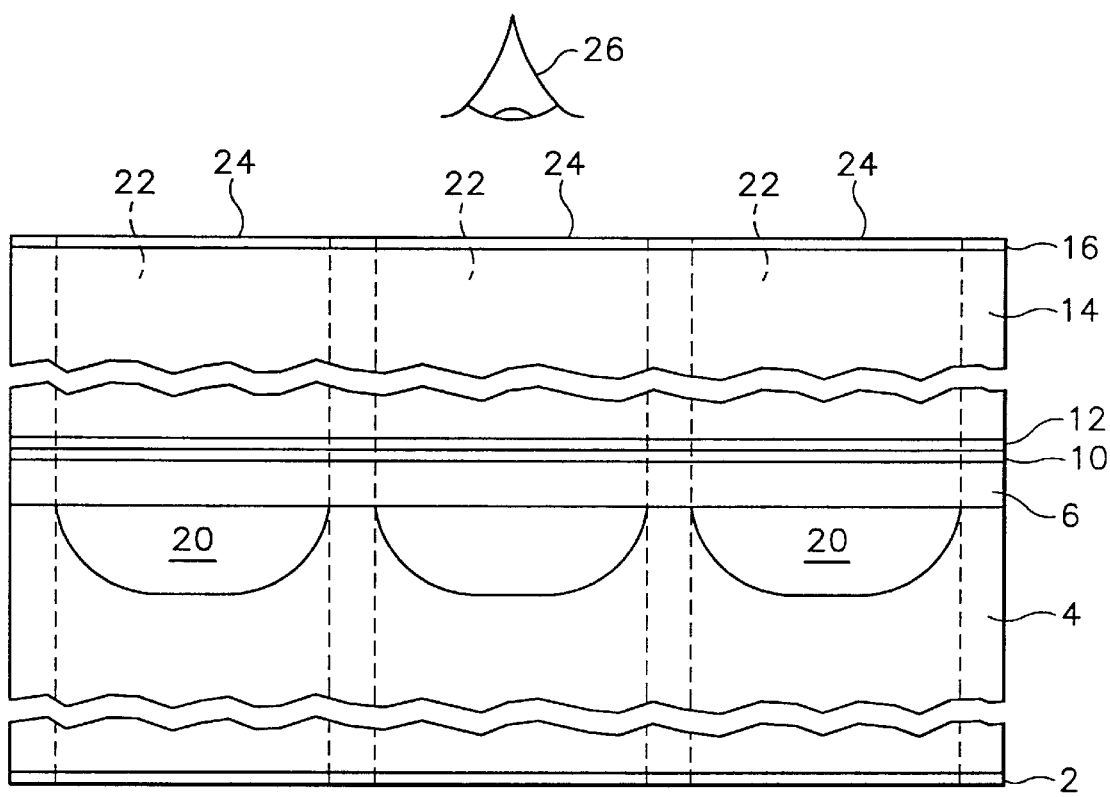
FIG. 4 is a sectional view of a PALC panel in accordance with the prior art.

FIG. 1A illustrates a possible procedure for manufacturing the panel shown in FIG. 1. In accordance with step 42 of FIG. 1A, the panel is assembled with the storage material in the container 34. At this point, the storage material is preferably not charged with hydrogen. The high temperature operations are then performed (step 44). The high temperature operations may involve heating the panel to a temperature of at least about 200° C. The panel is then exhausted (step 46) to a pressure below about $10^{-5}$ torr. The gases are then introduced into the panel (branch 48A or branch 48B), and the panel is sealed (step 50).

If the storage material had been charged with hydrogen at the time of assembly of the panel (42), safety considerations might necessitate that before the high temperature operations are performed, a preliminary evacuation be carried out under conditions of time, temperature and pressure such as to remove substantially all the hydrogen from the panel.

When introducing the gases, it is necessary to take account of the fact that some of the hydrogen introduced into the panel will be depleted by absorption into the storage material. There appear to be two main ways to accommodate this requirement. As shown by branch 48A, one procedure is to introduce hydrogen only (step 52) until equilibrium is established at the desired partial pressure of hydrogen, e.g. 36 mB (step 54), and then introduce helium (step 56) to bring the total pressure to 240 mB. Branch 48B illustrates the possibility of introducing a mixture of hydrogen and helium, but the relative concentrations of the two components and the pressure to which the gas mixture is introduced must take account of the fact that the absorption of hydrogen by the storage material, which may continue after the panel has been sealed, will reduce the partial pressure of hydrogen until equilibrium with the concentration of hydrogen in the storage material is attained.

It is important that the time scale over which hydrogen is released by the storage material not be much longer than the time scale over which hydrogen is consumed through operation of the panel. If, for example, the hydrogen were consumed through operation of the panel at a much higher rate than hydrogen were released by the storage material, the partial pressure of hydrogen could be reduced to such an extent that it would no longer ameliorate the problem caused by the metastable helium atoms. It would then be necessary to wait for hydrogen to be released in order to restore the quality of the display. However, by selecting an appropriate surface area to volume ratio for the hydrogen storage material, the rate of release of hydrogen can be made much greater than the rate at which hydrogen is consumed during operation of the display panel.

Figure 2:
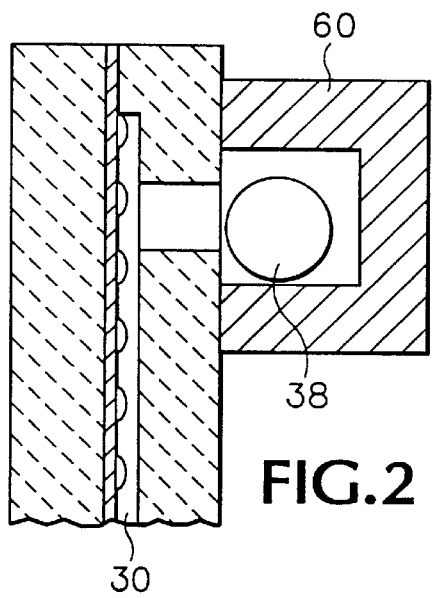
FIG. 2 is a partial sectional view of a first PALC panel in accordance with the invention.

It is conventional to attach a ceramic exhaust box to the channel substrate of a PALC display panel in order to accommodate a getter material. FIG. 2 shows that the tablet of hydrogen storage material may be accommodated in a ceramic exhaust box 60, either alone or with a getter. In this case, the container 34 for the hydrogen storage material is the exhaust box.

Figure 3:
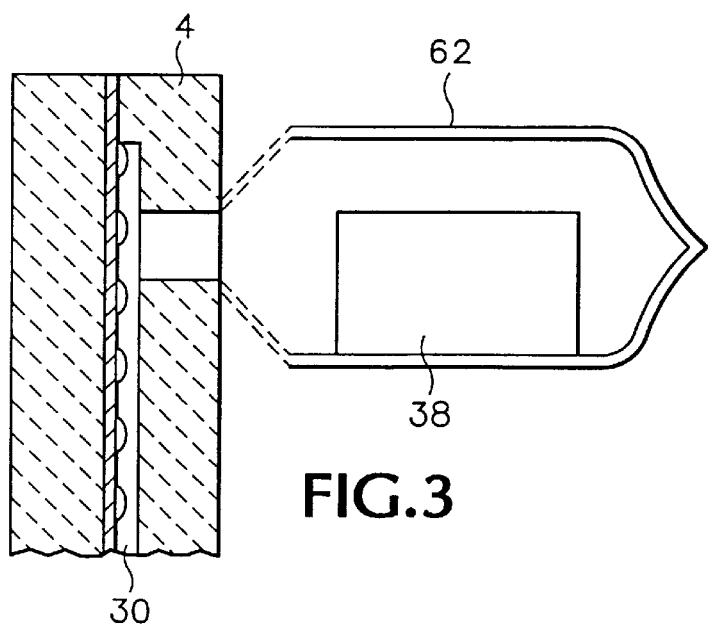
FIG. 3 is a similar view of a second PALC panel in accordance with the present invention.

During manufacture of a PALC display panel, an exhaust tube is connected to a vacuum pump for exhausting the panel (see step 44 in FIG. 1A). When the panel has been exhausted, the exhaust tube is connected to a helium source for introducing helium into the panel. Subsequently, the exhaust tube is sealed (step 50). FIG. 3 shows that the tablet of hydrogen storage material may be accommodated with clearance in an exhaust tube 62. Thus, in this case the container is a segment of the exhaust tube.

As noted above, helium is an advantageous choice for the ionizable gas in a PALC display panel because it is inert and helium ions are very light. However, argon also is inert, and although argon ions are substantially heavier than helium ions, the sputtering damage that would result from use of argon as the ionizable gas in a PALC display panel may be tolerable. Argon also has metastable states and the effect of the metastable states of argon on viewability of a PALC display panel employing argon as the ionizable gas can be ameliorated by doping the ionizable gas with hydrogen.

It will be appreciated that the invention is not restricted to the particular embodiments that have been described, and that variations may be made therein without departing from the scope of the invention as defined in the appended claims and equivalents thereof.

What is claimed is:

1. A plasma addressed liquid crystal display device comprising:
   a channel substrate defining an array of interconnected channels,
   a cover sheet extending over the channels and sealed to the channel substrate, whereby the channel substrate and the cover sheet define a sealed volume,
   an ionizable gas in said sealed volume,
   a pair of electrodes in each channel for selectively ionizing the gas in the respective channel, and
   a source of a dopant gas in communication with the sealed volume, said source comprising a body of a storage material that reversibly absorbs and releases said dopant gas, whereby an equilibrium is established between concentration of dopant gas in the body of material and partial pressure of the dopant gas in said sealed volume, and
   wherein the ionizable gas is helium and the dopant gas is hydrogen.

2. A plasma addressed liquid crystal display device comprising:
   a channel substrate defining an array of interconnected channels,
   a cover sheet extending over the channels and sealed to the channel substrate, whereby the channel substrate and the cover sheet define a sealed volume,
   an ionizable gas in said sealed volume,
   a pair of electrodes in each channel for selectively ionizing the gas in the respective channel, and
   a source of a dopant gas in communication with the sealed volume, said source comprising a body of a storage material that reversibly absorbs and releases said dopant gas, whereby an equilibrium is established between concentration of dopant gas in the body of material and partial pressure of the dopant gas in said sealed volume, and wherein the body of material is located in a container having an interior space that communicates with said sealed volume.

3. A plasma addressed liquid crystal display panel comprising:
   a channel substrate having a periphery and defining an array of parallel interconnected channels,
   a cover sheet extending over the channels and sealed to the channel substrate, whereby the channel substrate and the cover sheet define a sealed volume,
   argon in said sealed volume at a partial pressure within the range from about 50 mB to about 350 mB,
   a pair of electrodes in each channel for selectively ionizing the argon in the respective channel, and
   a body of a storage material that reversibly absorbs and releases hydrogen, the hydrogen being present at a partial pressure in the sealed volume within the range from about 0.02 mB to about 36 mB, said body of storage material being accommodated in an exhaust tube having an interior space that communicates with the channels.

4. A plasma addressed liquid crystal display panel comprising:
   a channel substrate having a periphery and defining an array of parallel interconnected channels,
   a cover sheet extending over the channels and sealed to the channel substrate, whereby the channel substrate and the cover sheet define a sealed volume,
   argon in said sealed volume at a partial pressure within the range from about 50mB to about 350 mB,
   a pair of electrodes in each channel for selectively ionizing the argon in the respective channel, and
   a body of a storage material that reversibly absorbs and releases hydrogen, the hydrogen being present at a partial pressure in the sealed volume within the range from about 0.02 mB to about 36 mB, said body of storage material being accommodated in an exhaust box that is attached to the channel substrate and has an interior space that communicates with the channels.

5. A plasma addressed liquid crystal display panel comprising:
   a channel substrate having a periphery and defining an array of parallel interconnected channels,
   a cover sheet extending over the channels and sealed to the channel substrate, whereby the channel substrate and the cover sheet define a sealed volume,
   helium in said sealed volume at a partial pressure within the range from about 50 mB to about 350 mB,
   a pair of electrodes in each channel for selectively ionizing the helium in the respective channel, and
   a body of a storage material that reversibly absorbs and releases hydrogen, the hydrogen being present at a partial pressure in the sealed volume within the range from about 0.02 mB to about 36 mB.

6. A display panel according to claim 5, wherein the body of storage material is accommodated in an exhaust tube having an interior space that communicates with the channels.

7. A display panel according to claim 5, wherein the body of storage material is accommodated in an exhaust box that is attached to the channel substrate and has an interior space that communicates with the channels.

* * * * *